Feb. 21, 1961  B. B. LLOYD  2,972,523
GAS ANALYSIS APPARATUS
Filed April 20, 1959  2 Sheets-Sheet 1
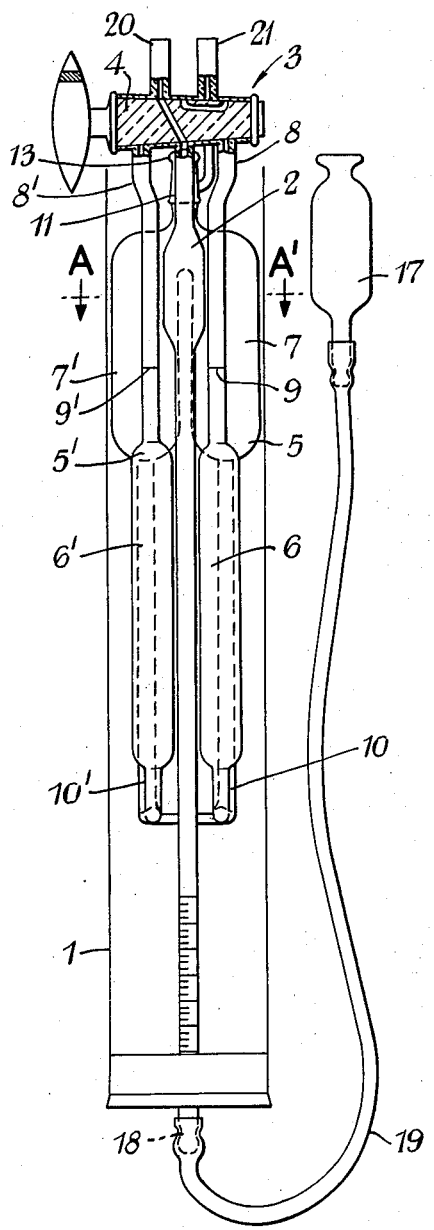
FIG.I
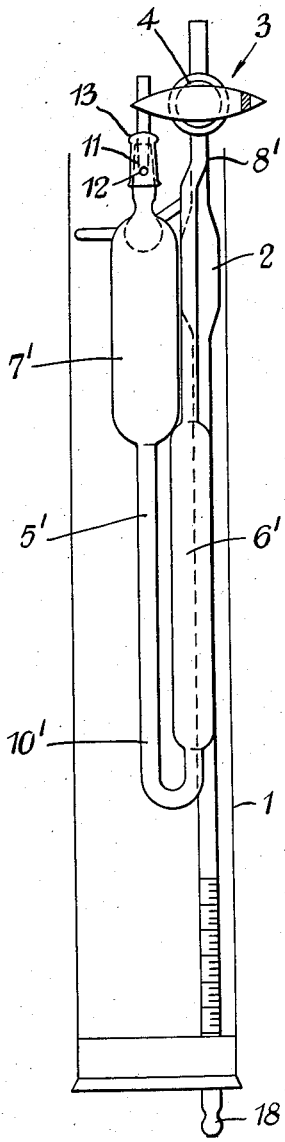
FIG.II
INVENTOR
Brian Beynon Lloyd
By Stevens, Davis, Miller & Mosher
ATTORNEYS Feb. 21, 1961 B. B. LLOYD 2,972,523
GAS ANALYSIS APPARATUS
Filed April 20, 1959 2 Sheets-Sheet 2
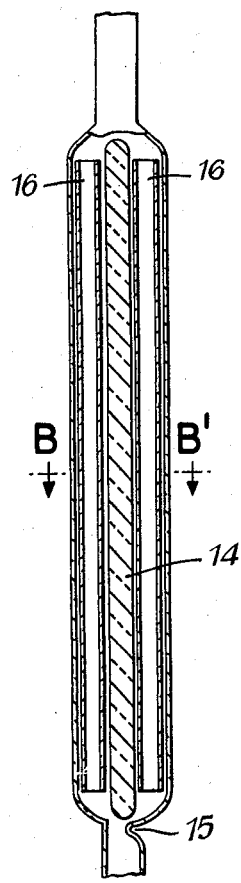
FIG. IV
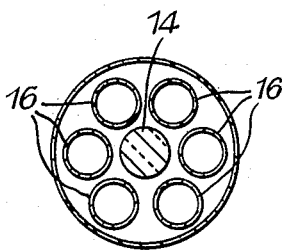
FIG. V
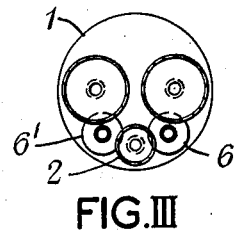
FIG. III
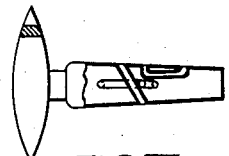
FIG. VI
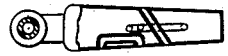
FIG. VII
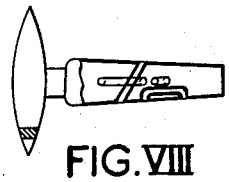
FIG. VIII
FIG. IX
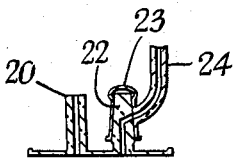
FIG. X
INVENTOR
Brian Beynon Lloyd
By Stevens, Davis, Miller & Mosher
ATTORNEYS United States Patent Office 2,972,523
Patented Feb. 21, 1961

2,972,523
GAS ANALYSIS APPARATUS
Brian Beynon Lloyd, 13 Charlbury Road, Oxford, England
Filed Apr. 20, 1959, Ser. No. 807,651
Claims priority, application Great Britain Apr. 25, 1958
10 Claims. (Cl. 23—256)

This invention is for improvements in or relating to apparatus for gas analysis and is especially, though not exclusively, concerned with apparatus for use in physiological analyses of respired air.

Gas analysis apparatus of the type in common use heretofore comprises a gas burette for receiving, through a tap connected to its upper end, a measured sample of gas, such burette communicating with a mercury reservoir thereby to maintain in the burette a level of mercury dependent inter alia upon the height of the reservoir, and one or a series of absorption pipettes which can be put in communication with the gas burette through the aforesaid tap. By raising or lowering the reservoir, gas is expelled from or drawn into the burette and the pressure in the latter is adjusted. The absorption pipette (or one of the series of absorption pipettes) comprises two vessels connected to form a U-shaped unit, one constituting a gas absorption chamber and the other a movable reservoir for the absorbent liquid, which is open to the atmosphere above the liquid level. The absorption chamber is connected at its lower part with a control tube, the function of which is to enable the readings of the burette to be made independent of changes in temperature and barometric pressure during analysis.

Apparatus of the aforesaid type is in wide use for various purposes, such as the estimation of carbon dioxide and of oxygen in respired air. It is, however, disadvantageous in a number of respects. Firstly, each reading of the burette requires two adjustments, viz. bringing absorbent liquid in the connection to the control tube to a set mark by raising or lowering the absorbent liquid reservoir and, at the same time, bringing absorbent liquid in the pipette to a set mark by adjusting the levelling tube (mercury reservoir). This operation encourages inaccuracy and is tedious and time-consuming. Secondly, as is well known, such an apparatus will not give accurate results on windy or gusty days because of oscillations in the absorption liquid level, the reservoir for which is open to the atmosphere. Thirdly, analyses can be done only at pressures not greatly different from atmospheric pressure. Although many modifications or alleged improvements in such apparatus have from time to time been proposed, all have retained the use of a control tube and dummy burette, as a compensator for temperature and pressure changes, and two absorption liquid menisci for the absorption pipette to which the control tube and dummy burette are connected.

It is the object of the present invention to provide a more simple form of gas analysis apparatus which permits substantially quicker and more convenient gas analysis without loss of accuracy. In the apparatus of the invention the need for a separate control tube as a compensator is eliminated and each reading of the burette requires the levelling of only one meniscus.

According to the present invention, apparatus for gas analysis comprising a gas burette, means for varying the pressure and available gas space within the burette (such means normally comprising a levelling tube terminating in a mercury reservoir and in open communication with the burette) and at least one absorption pipette, comprising an absorption chamber and a reservoir chamber, of which the absorption chamber is adapted for connection through valve means to the burette, is characterised in that the reservoir for absorption liquid is adapted to be closed against the atmosphere to provide above said liquid a closed volume of gas during an analysis.

It can be shown that variations in temperature and pressure outside the apparatus will not affect the accuracy of the determinations of gas volume in the burette if each measurement is made with the closed volume kept constant by adjustment of the levelling tube. The apparatus of the invention may, therefore, be used without inaccuracy in conditions of varying temperature and pressure, as indeed can the prior art apparatus, but without the disadvantages hereinbefore set forth.

When the apparatus of the invention contains more than one absorption pipette, it is convenient and preferable that the closed volumes above the absorption liquids in all the said pipettes be interconnected so that there is a single closed volume in the apparatus, and this closed volume is as large as practicable.

Preferably, the valve means between the burette and the absorption pipette or pipettes is a control tap with a multi-channel spigot, the channels being so arranged as to allow each pipette in turn to be connected to the burette. This spigot is also provided with one or more other channels for introducing gas to be analysed into the apparatus, for discharging analysed gas, and for attaching any auxiliary pipettes that may be required.

The apparatus (except for the tube connecting the mercury reservoir to the burette) is normally made entirely of glass, especially borosilicate glass, and is advantageously enclosed within a water bath, which can be stirred, to minimize as far as possible external fluctuations of temperature, particularly local fluctuations between different parts of the apparatus.

A particularly preferred form of gas analysis apparatus according to the invention is illustrated in the accompanying drawing, in which:

Figure I represents a front elevation, partly in section, of the apparatus,

Figure II represents a side elevation of the apparatus,

Figure III represents a section taken on the line A, A' shown in Figure I,

Figure IV represents an elevational cross-section of part of a pipette in the apparatus, Figure V represents a cross-section of the part of the pipette shown in Figure IV taken on the line B, B', Figures VI–IX represent front elevational cross-sections of the tap spigot when the tap is in four different operating positions, and Figure X represents an elevational cross-section of a form of gas inlet and outlet for the burette alternative to that shown in Figures I and II.

Referring to Figures I, II and III of the drawing, a housing 1, constituting a water-jacket, supports a vertical burette 2. Means (not shown) for agitating the water in the jacket are also provided. At the top of the burette there is a control tap 3 having a four-channel spigot 4. Two absorption pipettes 5, 5' each comprise two vertical cylindrical absorption chambers 6, 6' in which gas is absorbed and second chambers 7, 7' which provide the compensating volume by means of which the volume in the burette can be compensated for temperature variations, as explained more fully below. The tops of the absorption chambers 6, 6' of the pipettes are connected to the control tap by tubes 8, 8' on the vertical portions of which are index marks 9, 9'. The bottoms of the absorption chambers 6, 6' are connected to the bottoms of the corresponding second chambers 7, 7' by return bent tubes 10, 10'. The tops of the pair of second chambers 7, 7' are interconnected and a single conical outlet tubulure 11 is provided for the interconnected second chambers. The tubulure 11 is formed with a small hole in one side 12 and is closed by a ground-glass cap 13 having a side arm. This arrangement constitutes a tap through which exhausted absorbents and washing water may be withdrawn and air may be released or admitted between analyses. As shown in Figures IV and V the absorption chamber of each pipette 6, 6' contains a central glass rod 14 retained by an indentation 15 in the tube surrounded by six empty glass packing tubes 16. The central glass rod is in place of the central tube previously used in the absorption pipettes of gas analysis apparatus which tends to allow bubbles of gas to pass from the absorption bulb to the second chamber.

An inlet tube 20 and outlet tube 21 are connected to tap 3.

In use, a mercury reservoir 17 (shown only in Figure I) is connected to the bottom 18 of the burette by a flexible tube 19, to enable the pressure in the apparatus and the movement of the gas under test to be controlled.

The four channels in the spigot 4 of the control tap 3 are such that in the first positon of the tap (shown in Figures I and VI of the drawings) the gas inlet tube 20 is connected to the gas measuring burette 2. In the second position of the tap (shown in Figure VII), the burette is connected to the absorption chamber 6'. In the third position of the tap (shown in Figure VIII), the burette is connected to the other absorption chamber 6. In the fourth position of the tap (shown in Figure IX), the burette is connected to the gas outlet tube 21. In any position of the tap between these four positions there is no open channel through the tap. The tap spigot may be a solid member formed with bores or may be a hollow glass member with tubes, corresponding with the bores, produced by blowing.

The apparatus is used as follows:

(a) *Preparation of the apparatus for use*

The liquid absorbents are each introduced into the appropriate pipette by means of a syringe fitted with a flexible tube of polyethene, or similar material, passed through the conical tubulure 11. If the liquid absorbents are such that they must be kept out of contact with the atmosphere, liquid paraffin may be introduced into the second chambers of the pipettes so as to form protective layers on the surfaces of the liquid absorbents.

The tap 3 is turned to the fourth position and a volume of air, about equal to the volume of the burette, is sucked into the burette through the tube 21. The cap 13 on the tubulure 11 is then opened and the tap is turned to the third position. The surface of the absorbent in pipette 5 is brought to mark 9 by moving the reservoir 17. It is desirable, in the interests of accuracy, that the surface should be brought down to the mark as this tends to eliminate errors caused by imperfect wetting of the walls of the vessel by the absorbent. The tap is then brought to its second position and the surface of the absorbent in pipette 5' is similarly adjusted to mark 9'. The cap 13 is then closed.

The upper parts of the second chambers 7 and 7' now contain a fixed volume of gas confined between the surfaces of the two absorbents in the apparatus. Since the volumes of the absorbents remain effectively constant throughout, when the surfaces of the absorbents are brought to marks 9 and 9', the volume enclosed in second chambers 7 and 7' above the absorbent will always be the same. Moreover, if the burette 2 is in communication, via one or other of the absorbents, with this fixed volume of gas (i.e. if the tap is in the second or third position) and the surface of the intermediary absorbent is brought to its mark (9 or 9') by movement of the reservoir, the volume of gas in the burette will be measurable under conditions that compensate for any external variations of temperature or pressure.

The apparatus is now manipulated so that no gas absorbable by either of the absorbents remain in the spaces between the absorbents and the mercury.

(b) *Analysis of a gas sample*

The menisci of the absorbents are brought to their respective marks 9 and 9' and then the residual gas in the burette is expelled through tube 21 with the tap in the fourth position.

A sample of gas is drawn in through tube 20 with the tap in the first position. Its volume is measured with the two absorbents at their respective marks (9 and 9'). The tap is turned to its second position for this purpose. The sample of gas is then brought into contact with the absorbent in pipette 5' by raising and lowering the reservoir 17 several times. The volume of the sample is now read again. This gives the volume of gas absorbed in pipette 5'.

The tap is then turned to its third position and the absorption process is repeated for the other absorbent in pipette 5. Any absorbable gas between the tap 3 and the absorbent in pipette 5' is included in this absorption process by washing out with gas already treated with the absorbent in pipette 5. When the absorption process is complete, the absorbent in pipette 5 is brought to mark 9 and the tap turned to its second position. The absorbent pipette 5' is brought to mark 9', and the volume of gas in the burette measured.

For some purposes the apparatus of Figure I may be modified by replacing the plain outlet tube 21 by a conical ground tube 22 with an inverted L-bore, as shown in Figure X. A ground-glass socket 23 with a side arm 24, which may lead to other pipettes, is fitted to this conical tube, a tap thus being formed.

When this tap is closed and a combustion or other pipette is attached to, or fused on, the side arm 24, the whole, including side arm 24, the L-bore in tube 22 and the diagonal bore of spigot 4, may be kept filled with mercury, whilst spigot 4 can be freely turned.

In one example of the use of the apparatus, one pipette contains potash solution for the absorption of carbon dioxide while the second contains a solution of alkaline pyrogallol for the absorption of oxygen.

The apparatus just described and illustrated, compared with known pressure and temperature compensated gas analysis apparatus, is simple in construction, easier to mount and prepare for use, requires little maintenance, is easier to clean, may be used by relatively unskilled persons, enables the absorbents to be readily protected against atmospheric contamination, is more easily protected against external temperature fluctuation, is durable and reliable, employs largely non-perishable materials and yet provides results as accurate as those of prior used apparatus.

It should be understood that, although the operation of the invention preferably involves the use of mercury (because of its high density and the low solubility of gases in it) as a means for controlling the pressure in the apparatus and the movement of the gas under test, it is to be understood that any other convenient inert liquid, such as, for example, concentrated calcium chloride solution, might be used, though, generally speaking, this entails some loss of accuracy. The term "mercury" as used in this specification and in the appended claims is accordingly to be construed as including any such liquid which can be used in place of mercury in the apparatus described. Similarly, other known means for varying the pressure and available gas space within the burette may be employed in place of the levelling tube hereinbefore specifically described.

Besides the analysis of respired air already mentioned, the apparatus of the invention may also be used in the analysis of other gaseous mixtures such as those in flues or in mines.

I claim:

1. Apparatus for gas analysis comprising a gas burette, means for varying the pressure and available gas space within the burette, at least one absorption pipette comprising an absorption chamber in open connection with an enclosed reservoir chamber completely defined by rigid walls, and rigid valve means constituting burette and absorption chamber connecting means.

2. Apparatus for gas analysis comprising a gas burette, means for varying the pressure and available gas space within the burette, as least two absorption pipettes each comprising an absorption chamber and, in open connection therewith, an enclosed reservoir chamber completely defined by rigid walls, a rigidly defined open connection between the upper parts of the reservoir chambers and rigid valve means connecting the said burette with each of the said absorption chambers.

3. Apparatus as claimed in claim 2, wherein the reservoir chambers have an opening at the top stopped by a rigid closure.

4. Apparatus as claimed in claim 2 comprising a housing surrounding the said gas burette and the said reservoir chambers, the said housing being adapted to receive an attemperating fluid whereby the apparatus can be maintained at a uniform temperature throughout an analysis.

5. Apparatus for gas analysis comprising a gas burette, a levelling tube in open communication at one end with the said burette, a mercury reservoir in open communication with the other end of the said levelling tube, at least two absorption pipettes, each comprising an absorption chamber, and, in open connection therewith, an enclosed reservoir chamber completely defined by rigid walls, a rigidly defined open connection between the upper parts of the reservoir chambers, gas-inlet and gas-outlet defining means, and a control tap comprising a spigot containing channel-defining means for connection of the said burette in turn to each of the said absorption chambers and to the gas-inlet and gas-outlet defining means.

6. Apparatus as claimed in claim 5, wherein the reservoir chambers have an opening at the top stopped by a rigid closure.

7. Apparatus as claimed in claim 5 comprising a housing surrounding the said gas burette and the said reservoir chambers, the said housing being adapted to receive an attemperating fluid whereby the apparatus can be maintained at a uniform temperature throughout an analysis.

8. Apparatus for gas analysis comprising a gas burette, a levelling tube in open communication at one end with the said burette, a mercury reservoir in open communication with the other end of the said levelling tube, at least two absorption pipettes, each comprising an absorption chamber and, in open communication therewith, an enclosed reservoir chamber completely defined by rigid walls, a rigidly defined open connection between the upper parts of the reservoir chambers, an opening at the top of the reservoir chambers stopped by a rigid closure, gas-inlet and gas-outlet defining means, a control tap comprising a spigot containing channel-defining means for connection of the said burette in turn to each of the said absorption chambers and to the said gas-inlet and gas-outlet defining means, and a housing surrounding the said gas burette, the said absorption chambers and the said reservoir chambers, the said housing being adapted to receive an attemperating fluid whereby the apparatus can be maintaned at a uniform temperature throughout an analysis.

9. Apparatus as claimed in claim 8 in which the levelling tube is made of flexible material and the rest of the apparatus is made entirely of glass.

10. Apparatus for gas analysis comprising a levelling tube, a mercury reservoir in open communication with one end of the said levelling tube, and the following integers made entirely of glass, a gas burette in open communication with the other end of the said levelling tube, at least two U-shaped absorption pipettes, each comprising in one leg an absorption chamber and, in open communication therewith, in the other leg, an enclosed reservoir chamber completely defined by rigid walls, a rigidly defined open connection between the upper parts of the reservoir chambers, means defining an opening at the top of the reservoir chambers, a rigid closure for the said opening, gas-inlet and gas-outlet defining means, a control tap comprising a spigot containing channel-defining means for connection of the said burette in turn to each of the absorption chambers and to the said gas-inlet and gas-outlet defining means, and a housing surrounding the said gas burette, the absorption chambers and the reservoir chambers, the said housing being adapted to receive an attemperating fluid whereby the apparatus can be maintained at a uniform temperature throughout an analysis.

References Cited in the file of this patent

UNITED STATES PATENTS

| | | |
|---|---|---|
| 1,448,901 | Moreland | Mar. 20, 1923 |

FOREIGN PATENTS

| | | |
|---|---|---|
| 250,584 | Great Britain | June 18, 1931 |